United States Patent
Lackman et al.

(10) Patent No.: US 6,343,351 B1
(45) Date of Patent: Jan. 29, 2002

(54) METHOD AND SYSTEM FOR THE DYNAMIC SCHEDULING OF REQUESTS TO ACCESS A STORAGE SYSTEM

(75) Inventors: Robert Andrew Lackman, Wake Forest; Donald Ingerman, Raleigh; Thomas B. Genduso, Apex; Shah Mohammad Rezaul Islam, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/148,181

(22) Filed: Sep. 3, 1998

(51) Int. Cl.[7] .............................................. G06F 12/00
(52) U.S. Cl. .......................... 711/158; 711/111; 710/54
(58) Field of Search ........................ 711/111, 112, 151, 711/158, 167; 710/54

(56) References Cited

U.S. PATENT DOCUMENTS

| | | | | |
|---|---|---|---|---|
| 5,729,718 A | * | 3/1998 | Au ............................. | 711/167 |
| 5,835,962 A | * | 11/1998 | Chang et al. ............... | 711/206 |
| 5,915,260 A | * | 6/1999 | Sokolov ...................... | 711/113 |
| 6,023,720 A | * | 2/2000 | Aref et al. .................. | 709/103 |
| 6,078,998 A | * | 6/2000 | Kamel et al. ............... | 711/151 |

OTHER PUBLICATIONS

A.L. Narasimha Reddy and James C. Wyllie, "I/O Issues in a Multimedia System", IBM Almaden Research Center, IEEE, pp. 69–74, Mar. 1994.

David P. Anderson, Yoshitomo Osawa and Ramesh Govindan, "A File System for continuous Media", ACM Transactions on Computer Systems, vol. 10, No. 4, Nov. 1992, pp. 311–337.

Renu Chipalkatti, James F. Kurose and Don Towsley, Scheduling Policies for Real–Time and Non–Real–Time Traffic in a Statistical Multiplexer, Department of Computer and Information Science, IEEE, pp. 774–783.

A.L. Narasimha Reddy and Jim Wyllie, "Disk scheduling in a multimedia I/O system", ACM Multimedia, pp. 225–233, 1993.

Robert K. Abbott and Hector Garcia–Molina, "Scheduling Real–Time Transactions: A Performance Evaluation", ACM Transactions on Database Systems, vol. 17, No. 3, Sep. 1992, pp. 513–560.

G.A. Awater and F.C. Schoute, "Performance Improvement of Fast Packet Switching by LDOLL Queueing", IEEE, pp. 562–568, 1992.

* cited by examiner

*Primary Examiner*—Matthew Kim
*Assistant Examiner*—M. D. Anderson
(74) *Attorney, Agent, or Firm*—Bracewell & Patterson, LLP (57) ABSTRACT

A method and system in data processing system are disclosed for the dynamic scheduling of a plurality of requests to access a disk. Each of the requests is associated with a location on the said disk which each of the requests is attempting to access. A scan queue is established for storing the plurality of requests. The plurality of requests are processed in a sequential order. The sequential order is determined utilizing the location on the disk being accessed by each of the requests. Upon one of the stored requests being urgent, the urgent request is processed. The urgent request is associated with a first location on said disk. Processing of the requests then continues in a second sequential order. The second sequential order is determined utilizing the first location. The next request to be processed is one of the requests which is associated with a physically closest location on the disk.

40 Claims, 8 Drawing Sheets

METHOD AND SYSTEM FOR THE DYNAMIC SCHEDULING OF REQUESTS TO ACCESS A STORAGE SYSTEM

BACKGROUND OF THE INVENTION

1. Technical Field

The present invention relates to data processing systems, and in particular to a method and system in a data processing system for dynamically scheduling a plurality of requests which include real-time and non-real-time requests. Still more particularly, the present invention relates to a method and system in a data processing system for scheduling non-real-time requests for processing as long as none of the real-time requests are urgent.

2. Description of the Related Art

Devices in a data processing system, such as disk drive adapters, are usually connected via a bus to transmit data from one device to and from other system resources, such as the central processor and memory. Each of these devices has data that it normally transfers. For example, one device may normally transfer real-time data such as is necessary to display a multimedia presentation. A second device may normally transfer non-real-time data that may be a file transfer. A third device may transfer both real-time and non-real-time data. The data transferred by these devices may be stored in a disk drive.

Real-time data is data that has an associated deadline. The deadline defines the time by which the real-time data must be transferred. Failure to transfer real-time data prior to the associated deadline will result in lost data. Non-real-time data has no associated deadline.

A computer system needs to support the transfer of both real-time and non-real-time data simultaneously. Often, however, when both real-time and non-real-time data are supported simultaneously, real-time data is not transferred in a timely manner without adversely affecting non-real-time data transfer. Since many of the data transfers come from disks, effective, efficient disk scheduling is important to provide timely delivery of data.

Modern disk storage systems use scheduling algorithms to order requests to minimize the amount of seeking, i.e. physical arm movement, a disk must do in order to locate the requested data. One such algorithm is called the elevator or SCAN algorithm. Each data request has an associated track on the physical disk on which the requested data is stored. This algorithm orders requests according to the track location on the disk where the data is stored. The disk first services the request for data stored on the outermost track, and then proceeds to service requests for data stored on tracks that are ordered towards the innermost track. Therefore, the disk is initially traversed from outermost to innermost track. When the innermost track that contains requested data is reached, the direction is reversed so that the disk is traversed from innermost track to outermost track, like an elevator stopping at selected floors. A variant of SCAN is called CSCAN. In CSCAN, instead of reversing direction when the innermost track is reached, the arm will travel back to the outermost track and seek inward again.

Therefore a need exists for a method and system in a data processing system to dynamically schedule a plurality of requests that include real-time and non-real-time requests, where the non-real-time requests are scheduled until a real-time request becomes urgent.

SUMMARY OF THE INVENTION

One object of the present invention is to provide an improved data processing system.

Another object of the present invention is to provide a method and system in a data processing system for dynamically scheduling a plurality of requests that include both real-time and non-real-time requests.

It is yet another object of the present invention to provide a method and system in a data processing system for dynamically scheduling a plurality of requests for processing as long as none of the real-time requests are urgent.

The foregoing objectives are achieved as is now described. A method and system in data processing system are disclosed for the dynamic scheduling of a plurality of requests to access a disk. Each of the requests is associated with a location on the said disk which each of the requests is attempting to access. A scan queue is established for storing the plurality of requests. The plurality of requests are processed in a sequential order. The sequential order is determined utilizing the location on the disk being accessed by each of the requests. Upon one of the stored requests being urgent, the urgent request is processed. The urgent request is associated with a first location on said disk. Processing of the requests then continues in a second sequential order. The second sequential order is determined utilizing the first location. The next request to be processed is one of the requests which is associated with a physically closest location on the disk.

The above as well as additional objectives, features, and advantages of the illustrative embodiment will become apparent in the following detailed written description.

BRIEF DESCRIPTION OF THE DRAWINGS

The novel features are set forth in the appended claims. The present invention itself, however, as well as a preferred mode of use, further objectives and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–9 of the drawings, like numerals being used for like and corresponding parts of the accompanying drawings.

The present invention defines two categories of real-time requests: hard real-time requests and soft real-time requests. These requests, along with non-real-time requests are stored in a scan queue and processed sequentially inaccordance with a SCAN or CSCAN algorithm until one of the real-time requests becomes urgent. The urgent request is then processed. The remaining requests are then processed sequentially from the location of the urgent real-time request.

All hard real-time requests are processed, even if they are past their associated deadlines. Soft real-time requests past their associated deadlines are discarded.

Real-time data may be classified into two categories: "hard real-time data" and "soft real-time data". Hard real-time data is data that must be transferred within a specified period of time. Failure to transfer any portion of hard real-time data before the deadline is catastrophic because critical data will be lost. Thus, the performance objective for the transfer of hard real-time data is to have no missed deadlines, and consequently, no lost data. An example of hard real-time data is aircraft flight system data.

Soft real-time data is data that should be transferred within a specified period of time, or deadline. Failure to transfer soft real-time data before the deadline results in lost data, where loss of some data is tolerable. The performance objective for the transfer of soft real-time data is to have a low percentage of missed deadlines, and consequently, a low percentage of lost data. An example of soft real-time data is packetized voice data.

Figure 1:
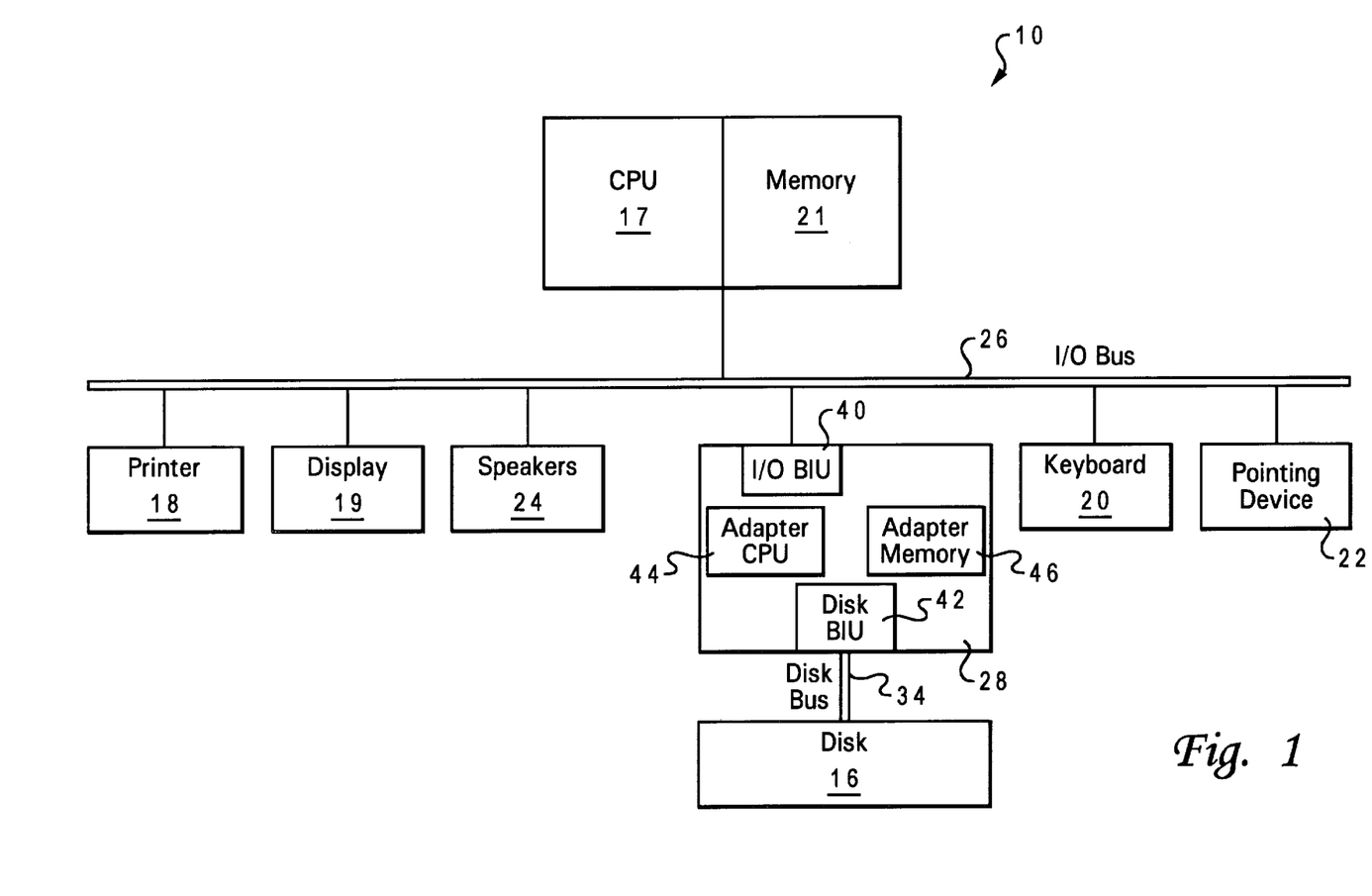
FIG. 1 depicts a high level block diagram of a data processing system which may be utilized to implement the method and system of the present invention.

FIG. 1 depicts a pictorial representation of a data processing system 10 which may be utilized to implement the method and system of the present invention. Data processing system 10 includes a disk 16 and a printer/output device 18. One or more disks may be utilized to store the various data objects or files which may be periodically accessed, processed, and presented within data processing system 10 in accordance with the method and system of the present invention.

Data processing system 10 may be implemented utilizing any suitably configured personal computer, mini computer, or mainframe computer. Data processing system 10 includes a CPU 17, memory 21, a computer display 19, keyboard 20, input pointing device 22, and speakers 24. Those skilled in the art will appreciate that input pointing device 22 may be implemented utilizing a pointing stick, a mouse, a track ball, or a pen.

The process described herein are supported by mechanisms within a disk adapter 28. Disk adapter 28 is coupled to CPU 17 by means of an I/O bus 26. In current systems, this bus is typically a PCI bus. Adapter 28 includes an I/O bus interface unit (BIU) 40. The I/O BIU 40 manages the protocol necessary for data and control information to be transmitted across I/O bus 26 between adapter 40 and CPU 17 and memory 21 to which adapter 28 is attached. In a similar fashion, disk adapter 28 attaches to disk 16 by means of a disk bus 34. In current systems bus 34 is typically a SCSI bus. Similarly, adapter 28 includes a disk BIU 42. Disk BIU 42 manages the protocol necessary for data and control information to be transmitted across disk bus 34 between adapter 28 and disk 16. Within adapter 28 there is a processing unit 44. Processing unit 44 can be implemented as a state machine or as a programmable microprocessor. Processing unit 44 is capable of executing the algorithms specified herein, as well as accessing the data stored in adapter memory 46.

Within adapter 28 is adapter memory 46. Adapter memory 46 can be implemented using Random Access Memory (RAM). Adapter processor 44 is capable of addressing locations within RAM 46, and can read and write data to adapter memory 46. Data and control information to or from the CPU 17 can be stored in adapter memory 46. Also contained within adapter memory 46 are a number of software data structures which are described below.

When adapter 28 is initially powered on, adapter 28 will perform a number of specific operations which include establishing a buffer pool space in adapter memory 46, establishing the scan queue data structure within adapter memory 46, and determining the geometry of the attached disk 16.

While data processing system 10 is in operation, adapter 28 will collect information that can be used in an effort to control the performance of adapter 28. This information is collected and stored in adapter memory 46. The information includes the number of times a hard real-time deadline was missed, the number of times soft real-time data were discarded due to a missed deadline, and the number of requests that have been serviced.

When adapter 28 is in operation, the information collected will be periodically checked by CPU 17. Depending on the values collected, CPU 17 will control the flow of data through adapter 28.

Adapter memory 46 represents a collection of addressable storage locations within adapter 28. Adapter memory 46 is separate from and independent of memory 21.

A number of logical data structures are contained within memory 46 of adapter 28:

(1) A scan queue 50: A specialized version of a doubly linked list data structure, for the purpose of ordering the outstanding requests to the disk. Scan queue 50 includes a plurality of scan elements 52.

(2) A buffer pool: A pool of storage locations where the I/O control blocks received from CPU 17 are stored.

(3) A set of four buffers:

(A) Most urgent hard real-time request buffer 54: This buffer includes two fields. The first field 56 includes the time, also called a deadline, by which the most urgent hard real-time request must be serviced. The second field 58 includes a pointer to the location in scan queue 50 that contains the most urgent hard real-time request. When there are no hard real-time requests in scan queue 50, the value in field 58 is set to the NULL value.

(B) Most urgent soft real-time request buffer 60: This buffer includes two field. The first field 62 includes the time, i.e. deadline, by which the most urgent soft real-time request must be serviced. The second field 64 includes a pointer to the location in scan queue 50 that includes the most urgent soft real-time request. In the event there are no soft real-time requests in scan queue 50, the value in field 64 is set to the NULL value.

(C) Current scan track pointer 66: The scan track pointer buffer includes two fields. The first field 68 includes a pointer to the element in scan queue 50 that is to be served next by disk 16. The second field 70 includes an indicator as to the direction in scan queue 50 to select the next element. This indicator can specify either ascending or descending track numbers.

(D) Status register which also includes the current time clock count 72: The status register includes three fields which are pertinent to the operation of the present invention. The first field includes a disk busy indicator. This indicator is set when the disk is busy serving a request and no further requests can be dispatched to it. This indicator is reset when the disk can receive another request. The second field contains the scan queue empty indicator. This indicator is set when there are one or more elements in the scan queue. It is reset when there are no elements in the scan queue. The third field 72 includes the current clock value. This is an encoding of the current time. The encoding is consistent with the time encoding included within the requests.

Scan queue 50 is a doubly linked list. The request which is to be serviced next by disk 16 is selected by traversing scan queue 50. Also, when either the most urgent hard real-time request or the most urgent soft real-time request must be immediately serviced, the current pointer can be directly updated and the scan can effectively continue without the need for reordering scan queue 50.

Figure 2:
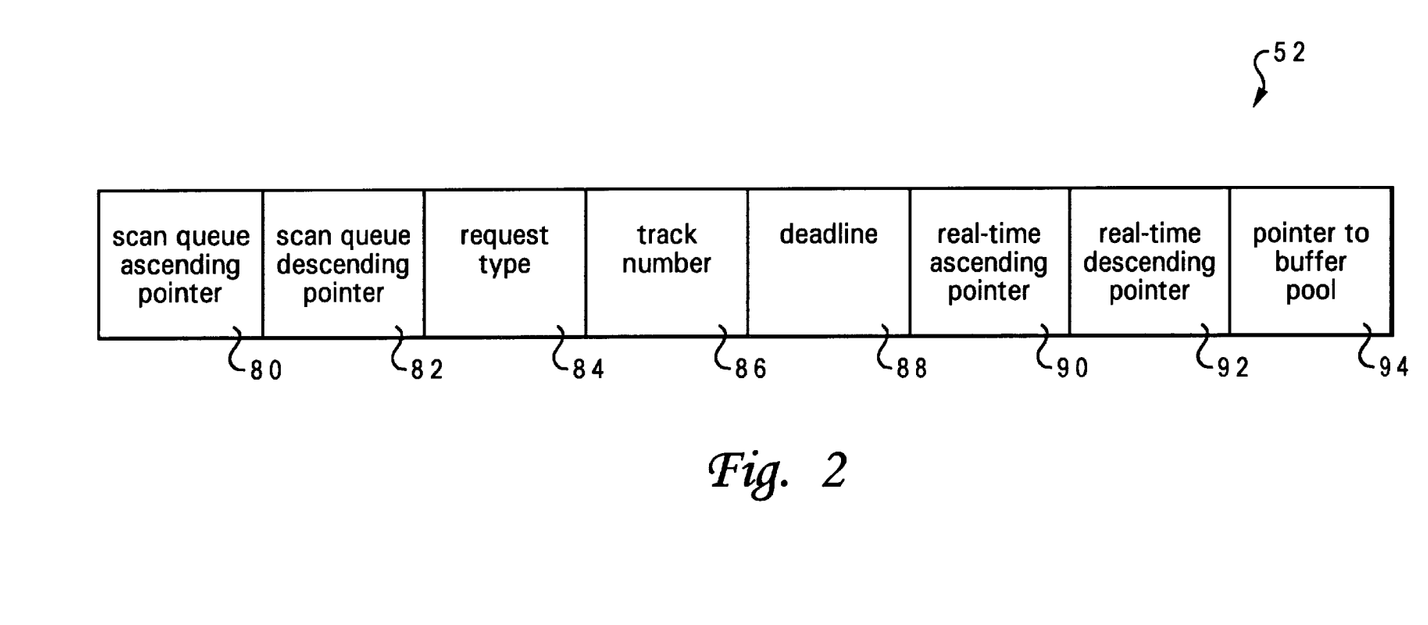
FIG. 2 illustrates a pictorial representation of scan queue elements and the associated fields included within each element in accordance with the method and system of the present invention.

Scan queue elements 52 have the structure as depicted in FIG. 2. In a manner consistent with the concept of a doubly linked list, the scan queue ascending pointer 80 points to the element of scan queue 50 which would have the next higher track number. Similarly, the scan queue descending pointer 82 points to the element of scan queue 50 which would have the next lower track number. When the value in scan queue ascending pointer 80 is set to NULL, this indicates that this element is the last element in scan queue 50, i.e. the element with the highest track number. Similarly, when the value in scan queue descending pointer 82 is set to NULL, this indicates that this element is the first element in scan queue 50, i.e. the element with the lowest track number. When scan queue ascending pointer 80 and scan queue descending pointer 82 of a element are both NULL, the element is the only element in scan queue 50.

The request type 84 indicates the type of service request. The request types are hard real-time, soft real-time, and non-real-time.

The track number 86 includes the track number on disk 16 that contains the requested data. The track number is used to determine where in scan queue 50 the request is to be placed.

The deadline 88 is used to indicate when the element in scan queue 50 must be serviced. The deadline only has relevance if the request is real-time.

The real-time ascending pointer 90 and the real-time descending pointer 92 are used to effectively "chain together" the real-time requests. Just as scan queue 50 is a doubly linked list which indicates the order by which requests are to be serviced by disk 16, real-time ascending pointer 90 and real-time descending pointer 92 are used to order the real-time requests within scan queue 50 by their urgency. For hard real-time elements in scan queue 50, their ascending real-time pointer 90 points to the next less urgent hard real-time request in scan queue 50. Descending real-time pointer 92 points to the next most urgent hard real-time request in scan queue 50.

Similarly, for soft real-time elements, ascending real-time pointer 90 points to the next less urgent soft real-time request in scan queue 50 and descending real-time pointer 92 points to the next most urgent soft real-time request in scan queue 50. In both cases, for the most urgent real-time requests in scan queue 50, setting ascending pointer 90 of a hard real-time element to NULL indicates that this element is the least urgent hard real-time request currently in scan queue 50. Similarly, setting descending pointer 92 of a hard real-time element is set to NULL indicates that this element is currently the most urgent hard real-time element currently in scan queue 50. This principle is the same for the soft real-time requests currently in scan queue 50. For non-real-time requests, real-time ascending 90 and descending 92 pointers are set to NULL.

The pointer to buffer pool 94 points to the location in the buffer pool where host computer I/O command block data is placed.

The manner by which requests are placed into scan queue 50 is now described. When an application program running on CPU 17 and accessing memory 21 wishes to access disk 16, whether to write data to or read data from disk 16, the application will construct an I/O command request block. The I/0 command request block will include specifications for the following data which are significant to the operation of the present invention: type of request, deadline, and logical block address. The deadline is an encoding of the time by which the request must be serviced. The logical block address is translated by adapter 28 to indicate the disk track number which is used by the present invention.

The I/O command request block will be placed into adapter memory 46 where it will be processed. From the information included within the request block, one or more scan queue elements will be constructed. The I/O command request block data will be store in the adapter buffer pool. The location in the buffer pool where it is stored is in pointer to buffer pool 94 in the scan queue element.

Figure 3:
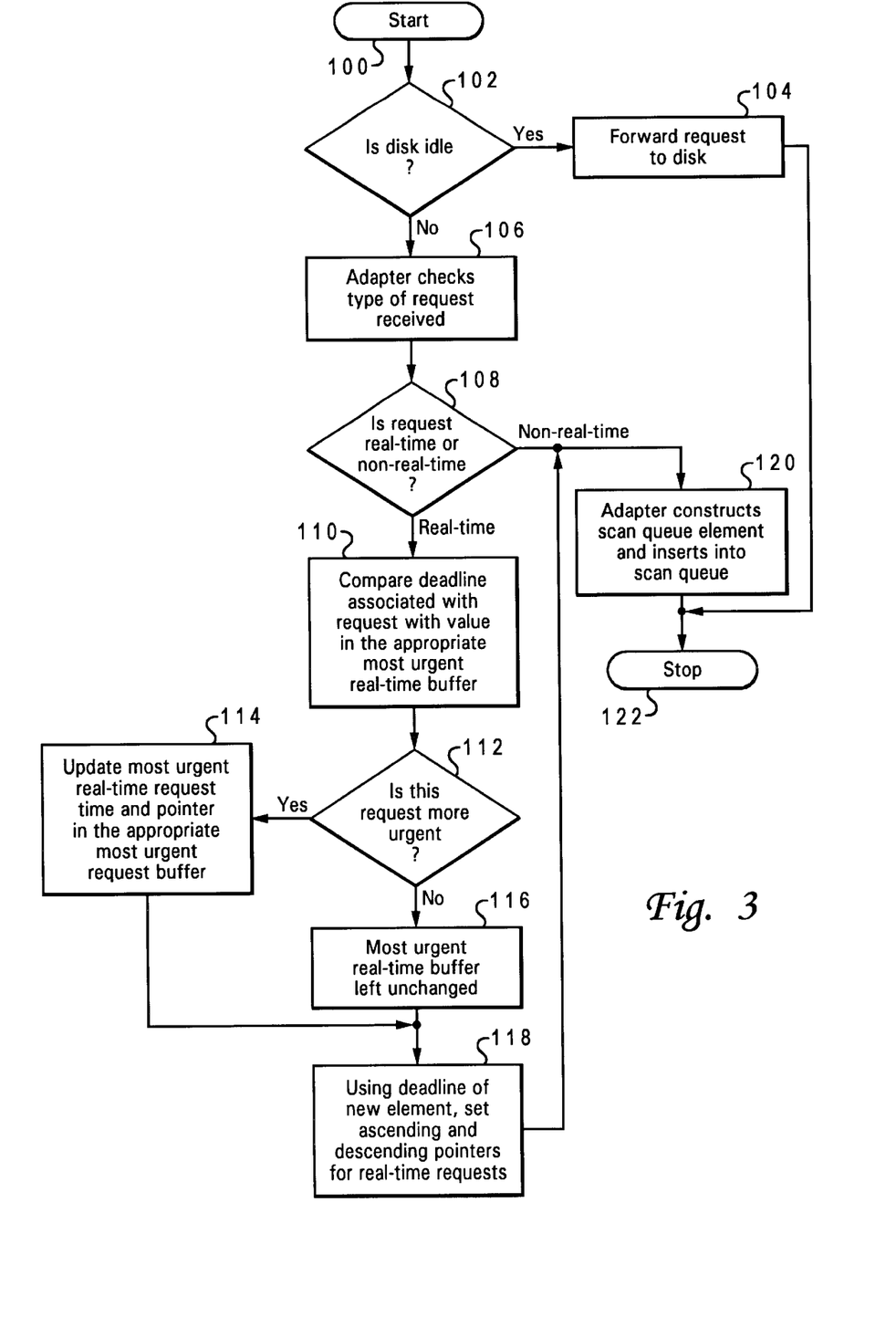
FIG. 3 illustrates a high level flow chart which depicts the creation of a scan queue element and the insertion of the element into the scan queue in accordance with the method and system of the present invention.

FIG. 3 illustrates a high level flow chart which depicts the creation of a scan queue element and the insertion of the element into the scan queue in accordance with the method and system of the present invention. The process starts as depicted at block 100 and thereafter passes to block 102 which illustrates a determination of whether or not the disk is idle and the scan queue is empty. If the disk is idle and the scan queue is empty, the process passes to block 104 which illustrates the request that is represented by this element being forwarded directly to the disk. Otherwise, using the disk track value of the request, adapter 28 will traverse the scan queue to determine where in the scan queue this request is to be placed. The process passes to block 106 which depicts adapter 28 checking the type of request received.

The process then passes to block 108 which illustrates a determination of whether this request is real-time or non-real-time. If the request is a hard real-time or soft real-time request, the process passes to block 110 which illustrates adapter 28 checking the deadline for the request and comparing it to the value in the appropriate most urgent real-time buffer. Next, block 112 depicts a determination of whether or not this request is more urgent than the most urgent request already stored in scan queue 50. If a determination is made that this request is more urgent, the process passes to block 114 which illustrates the updating of the most urgent real-time request time and pointer in the appropriate most urgent request buffer. The process then passes to block 118.

Referring again to block 112, if a determination is made that this request is not more urgent than the appropriate most urgent request already stored, the process passes to block 116 which depicts leaving the appropriate most urgent real-time buffer alone.

Block 118 illustrates the real-time ascending and real-time descending pointers being set using the deadline of this new element. The adapter traverses the list of real-time requests using the real-time ascending and descending pointers and request type and determines the appropriate settings for these pointers in a manner consistent with the insertion of a new element into a doubly linked list. The adapter will then set the pointers in the new scan queue element. Next, block 120 illustrates adapter 28 constructing the new scan queue element and inserting it into the scan queue. The process then terminates as depicted by block 122.

The assumption has been made that when adapter 28 accepts a request from CPU 17 there is sufficient space within adapter memory 46 to support the operation. This includes space within adapter memory 46 to contain a scan queue element. If such space does not exist, adapter 28 will not accept the request for service.

Figure 4:
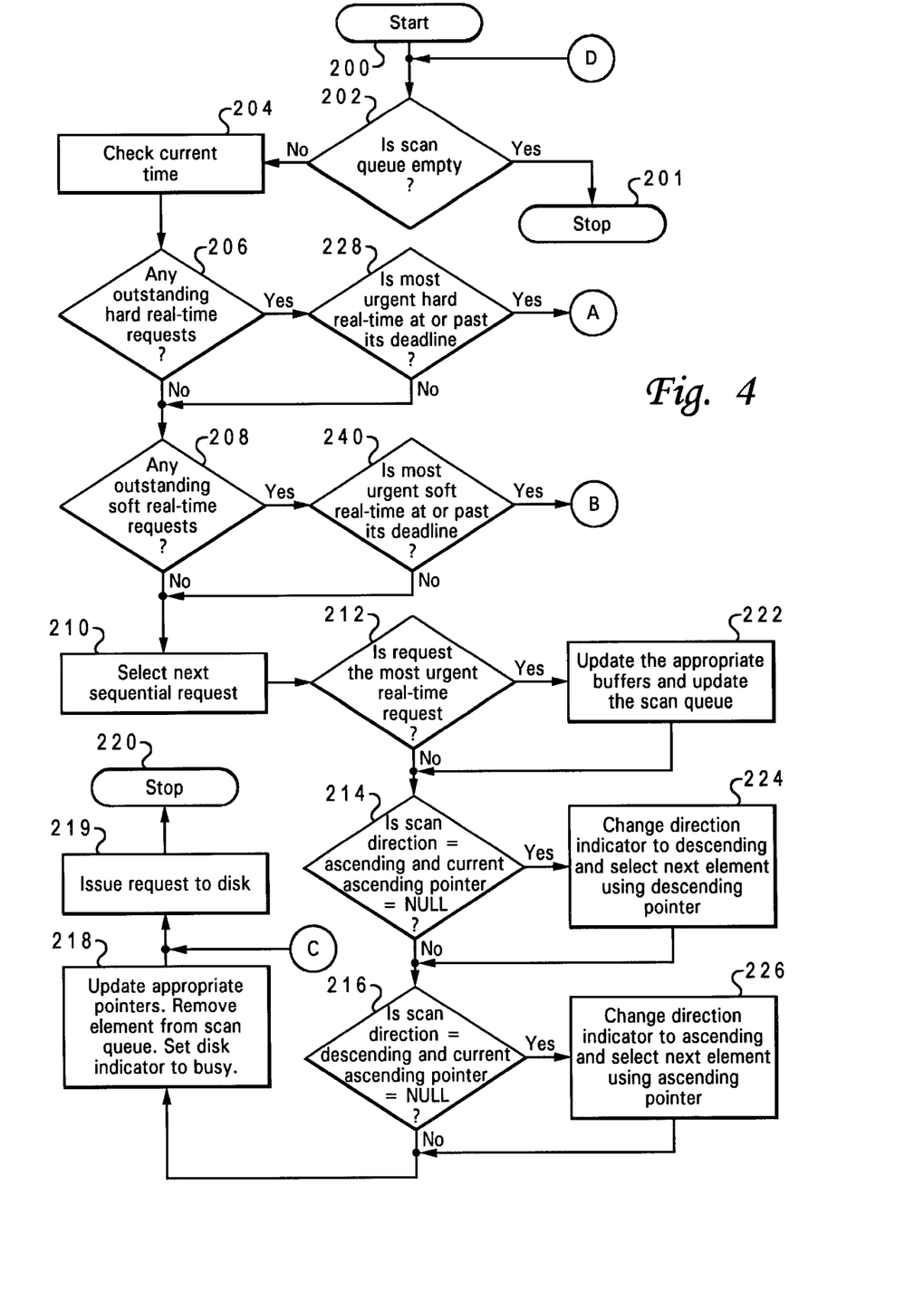
FIGS. 4–6 together depicts a high level flow chart which illustrates the removal of scan queue elements from the scan queue in accordance with the method and system of the present invention.
Figure 5:
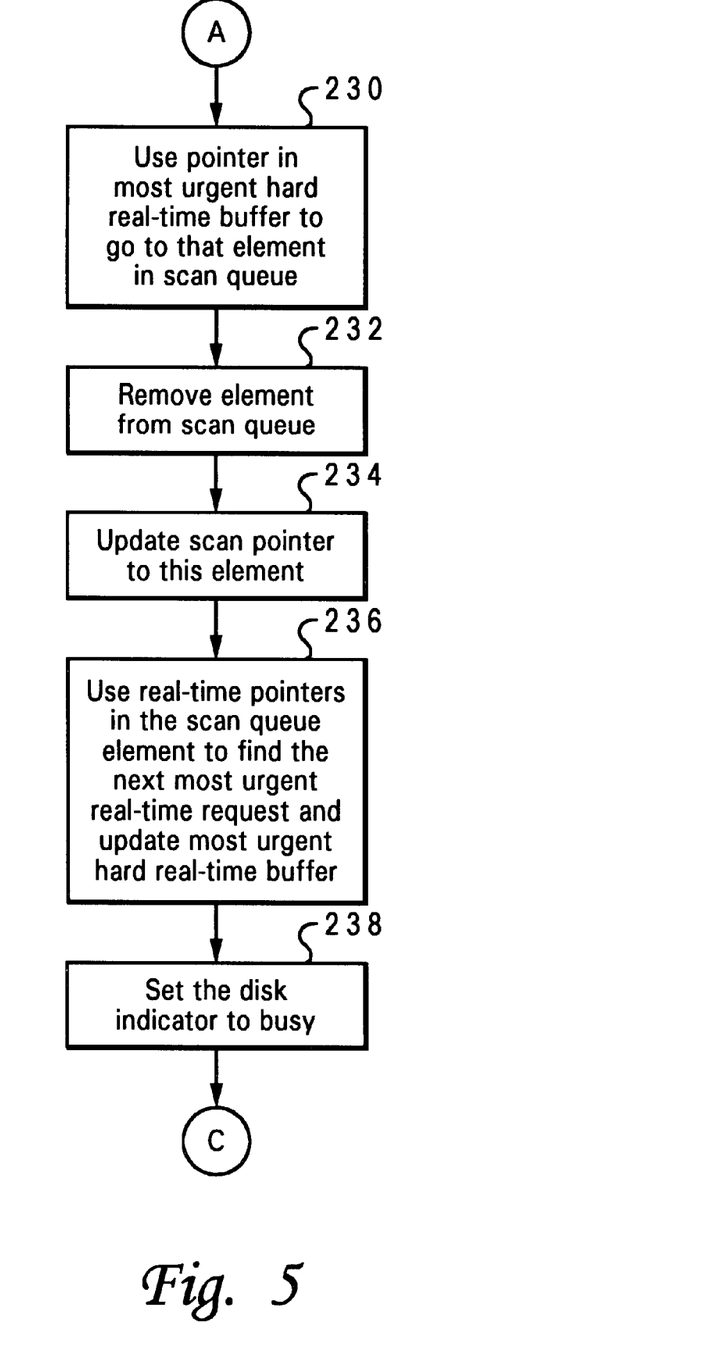
Figure 6:
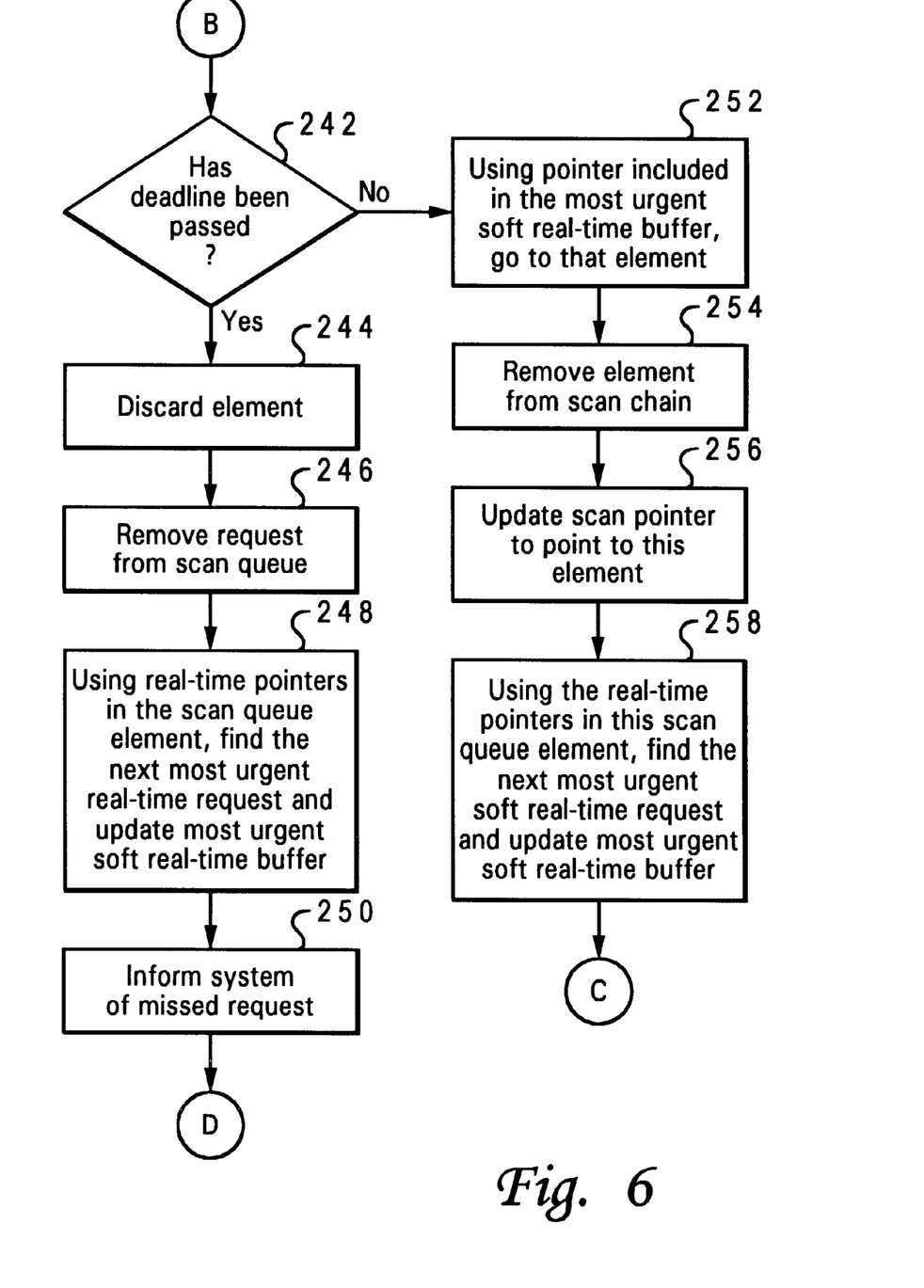

FIGS. 4–6 together depict a high level flow chart which illustrates the removal of requests from scan queue 50 in accordance with the method and system of the present invention. The process starts as depicted by block 200 and thereafter passes to block 202 which illustrates a determination of whether or not the scan queue is empty. If a determination is made that the scan queue is empty, the process terminates as depicted by block 201. If a determination is made that the scan queue is not empty, the process passes to block 204 which illustrates the checking of the current time. Next, block 206 depicts a determination of whether or not there are any outstanding hard real-time requests in the scan queue. If a determination is made that there are no hard real-time requests in the scan queue, the process passes to block 208 which illustrates a determination of whether or not there are any outstanding soft real-time requests in the scan queue. If a determination is made that there are no soft real-time requests in the scan queue, the process passes to block 210.

Block 210 depicts the selection of the next request in the scan queue which is the next in sequence when utilizing a SCAN or CSCAN algorithm. Thereafter, block 212 depicts a determination of whether or not this request is either the most urgent real-time request or the most urgent soft real-time request. If a determination is made that this request is not the most urgent real-time request, the process passes to block 214 which illustrates a determination of whether or not the scan direction indicator is set to ascending and the current ascending pointer has a value of NULL. If a determination is made that the scan direction indicator is not set to ascending or the current ascending pointer does not have a value of NULL, the process passes to block 216 which depicts a determination of whether or not the scan direction indicator is set to descending and the current descending pointer has a value of NULL. If a determination is made that the scan direction indicator is not set to descending or the current descending pointer does not have a value of NULL, the process passes to block 218 which illustrates the updating of the appropriate pointers, removal of the element from the scan queue and the setting of the disk indicator to busy. The process passes to block 219 which depicts the issuing of the request to the disk. The process then terminates as illustrated by block 220.

Referring again to block 212, if a determination is made that this request is the most urgent real-time request, the process passes to block 222 which illustrates the updating of the appropriate buffers and the updating of the scan queue. The process then passes to block 214.

Referring again to block 214, if a determination is made that the scan direction indicator is set to ascending and the current ascending pointer does have a value of NULL, the process passes to block 224 which depicts the changing of the direction indicator to descending and the selection of the next element using the descending pointer. The process then passes to block 216.

Referring again to block 216, if a determination is made that the scan direction indicator is set to descending or the current descending pointer does not have a value of NULL, the process passes to block 226 which depicts the changing of the direction indicator to ascending and the selection of the next element using the ascending pointer. The process then passes to block 218.

Referring again to block 206, if a determination is made that there are outstanding hard real-time requests to be processed, the process passes to block 228 which illustrates a determination of whether or not the most urgent hard real-time request is at or past its deadline. If a determination is made that no hard real-time request is at or past its deadline, the process passes back to block 208.

Referring again to block 228, if a determination is made that there is a hard real-time request at or past its deadline, the process passes to block 230 which depicts using the pointer included in the most urgent hard real-time buffer to go to that element. Next, block 232 illustrates the removal of the element from the scan queue. Block 234, then, depicts the updating of the scan pointer to this element. Since the scan queue is a doubly linked list data structure, the scan queue ascending pointer 80 of the element with the next lower track number and the scan queue descending pointer 82 of the element with the next higher track number will be updated in a manner consistent with the removal of an element from a doubly linked list. The process then passes to block 236 which illustrates using the real-time pointers in this scan queue element to find the next most urgent real-time request, and the updating of the most urgent hard real-time buffer. Thereafter, block 238 depicts the setting of the disk indicator to busy. The process then passes back to block 219.

Referring again to block 240, if a determination is made that the most urgent soft real-time request is at or past its deadline, the process passes to block 242 which illustrates a determination of whether or not the deadline has passed. If a determination is made that the deadline has passed, the process passes to block 244 which depicts the discarding of the element. Next, block 246 illustrates the removal of the request from the scan queue in a manner consistent with the manner of the removal of an element from a doubly linked list. Thereafter, block 248 depicts using the real-time pointers in the scan queue element, to find the next most urgent soft real-time request. The most urgent soft real-time buffer is updated. Next, block 250 illustrates informing CPU 17 of the missed request. The process then passes back to block 202.

Referring again to block 242, if a determination is made that the deadline has not passed, the process passes to block 252 which illustrates using the pointer included in the most urgent soft real-time buffer to go to that element. Next, block 254 depicts the removal of the element from the scan queue in a manner consistent with the removal of an element from a doubly linked list. Thereafter, block 256 illustrates the updating of the scan pointer to point to this element. Block 258, then, depicts using the real-time pointers in this scan queue element to find the next most urgent soft real-time request. The most urgent soft real-time buffer is updated. The process then passes back to block 219.

Figure 7:
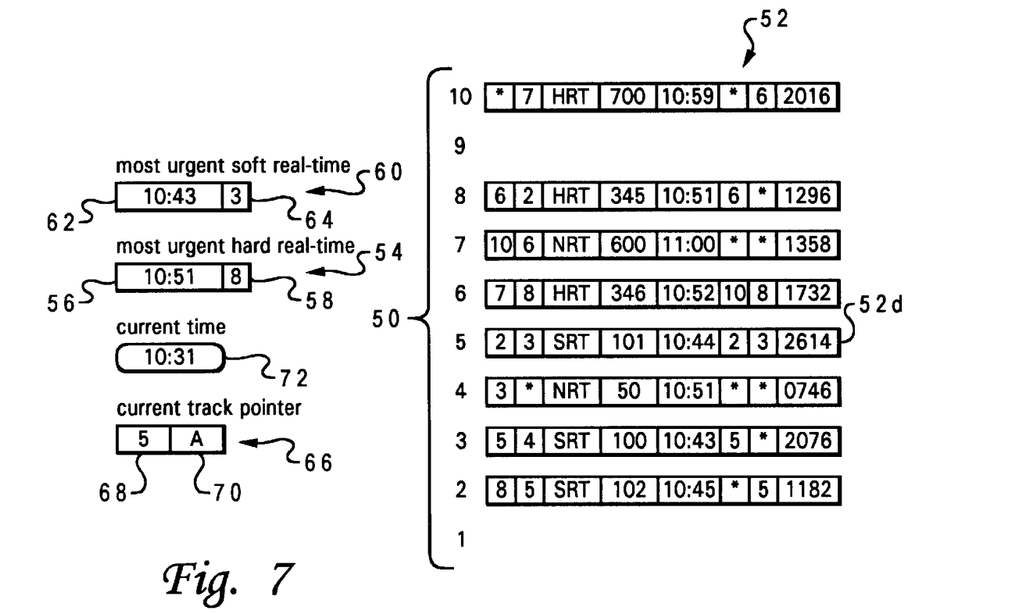
FIG. 7 depicts a plurality of scan queue elements stored within a scan queue, a most urgent soft real-time buffer, a most urgent hard real-time buffer, a current time clock, and a current track scan pointer in accordance with the method and system of the present invention.

The following is a simplified example of the operation of the scan queue. In this example, the scan queue includes ten logical memory locations for storing scan queue elements. The disk has 1000 tracks. Currently, there are eight outstanding disk requests. Of these requests, three are hard real-time requests and three are soft real-time requests. The hard real-time requests are for tracks 345, 346, and 700. Track 345 is the most urgent. Track 700 is the least urgent. The soft real-time requests are for tracks 100, 101, and 102. Track 100 is the most urgent. Track 102 is the least urgent.

FIG. 7 depicts a scan queue having scan queue elements, a most urgent soft real-time buffer, a most urgent hard real-time buffer, a current time clock, and current track scan pointer in accordance with the method and system of the present invention. The current time is 10:31. The most urgent hard real-time request must be serviced at or before 10:52. The most urgent soft real-time request must be serviced at or before 10:43. The current scan track pointer is pointing to the logical memory location 5. The current track pointer indicates that the scan is to be in the ascending direction.

Assuming no further requests are received and that the next request can be serviced before any deadlines are reached, the following occurs. The current track pointer points to the element stored at location 5. This is the request for track 101. When the disk is ready, this request is removed from the scan queue and sent to the disk. The scan queue element is removed using the standard methodology for removing an element from a doubly linked list.

Figure 8:
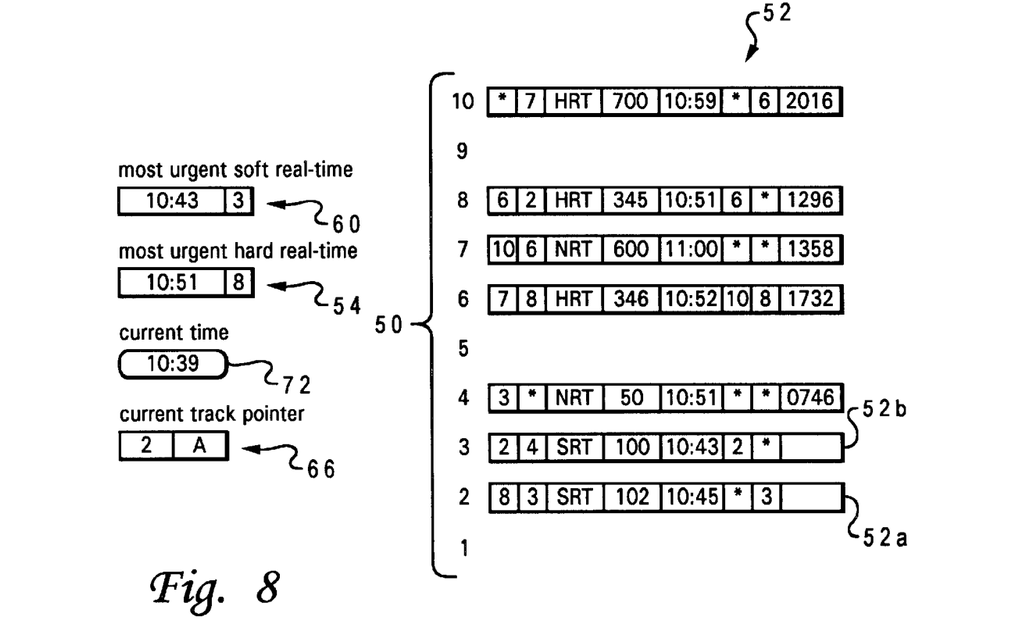
FIG. 8 illustrates the scan queue elements stored within a scan queue, the most urgent soft real-time buffer, the most urgent hard real-time buffer, the current time clock, and the current track scan pointer of FIG. 7 after the next sequential request has been removed in accordance with the method and system of the present invention.

FIG. 8 illustrates scan queue elements, a most urgent soft real-time buffer, a most urgent hard real-time buffer, a current time clock, and current track scan pointer of FIG. 7 after the next sequential request 52d has been removed in accordance with the method and system of the present invention. The current time is now shown to be 10:39. In the scan queue, the element at location 2 will be the next element removed. The scan queue ascending pointer of the element at location 3 is set to the value of the scan queue ascending pointer of the removed element. Therefore, the scan queue ascending pointer 80 for element 3 is now set to 2. Similarly, the scan queue descending pointer of the element at location 2 is set to the value of the scan queue descending pointer of the element removed. Therefore, the scan queue descending pointer 82 for the element at location 2 is now set to 3.

Since the element of the scan queue is a soft real-time request, the chain of soft real-time requests is also updated. By coincidence the elements of the scan queue that were effected are the same elements. However, this will typically not be the case. The real-time ascending pointer of the element at location 3 is set to the value of the real-time ascending pointer of the element removed. Similarly, the real-time descending pointer of the element at location 2 is set to the value of the real-time descending pointer of the element removed. The current time has been changed to indicate the elapsed time.

Elements will be removed in track order: 101, 102, 345, 346, and 600. When it is time to remove the request for track 700 from the scan queue, the element at location 10 will have a descending pointer of 3 and an ascending pointer of NULL. An ascending pointer of NULL is an indication that the highest track number of the elements currently on the scan queue has been reached. At this point, the direction flag in the current track pointer will be set to descending and the next request removed from the scan queue will be selected using the scan queue descending pointer of the element at location 10. At this time the last request on the scan queue will be removed in the following order: 700, 100, 50.

When the scan queue element at location 4 is removed, both its scan queue ascending and descending pointers would have been set to NULL. This is assuming that no further elements have been added to the scan queue. This is an indication that this is the last element in the scan queue. When this element is removed, the scan queue empty indicator in the status register is set to indicate that the scan queue is empty.

Figure 9:
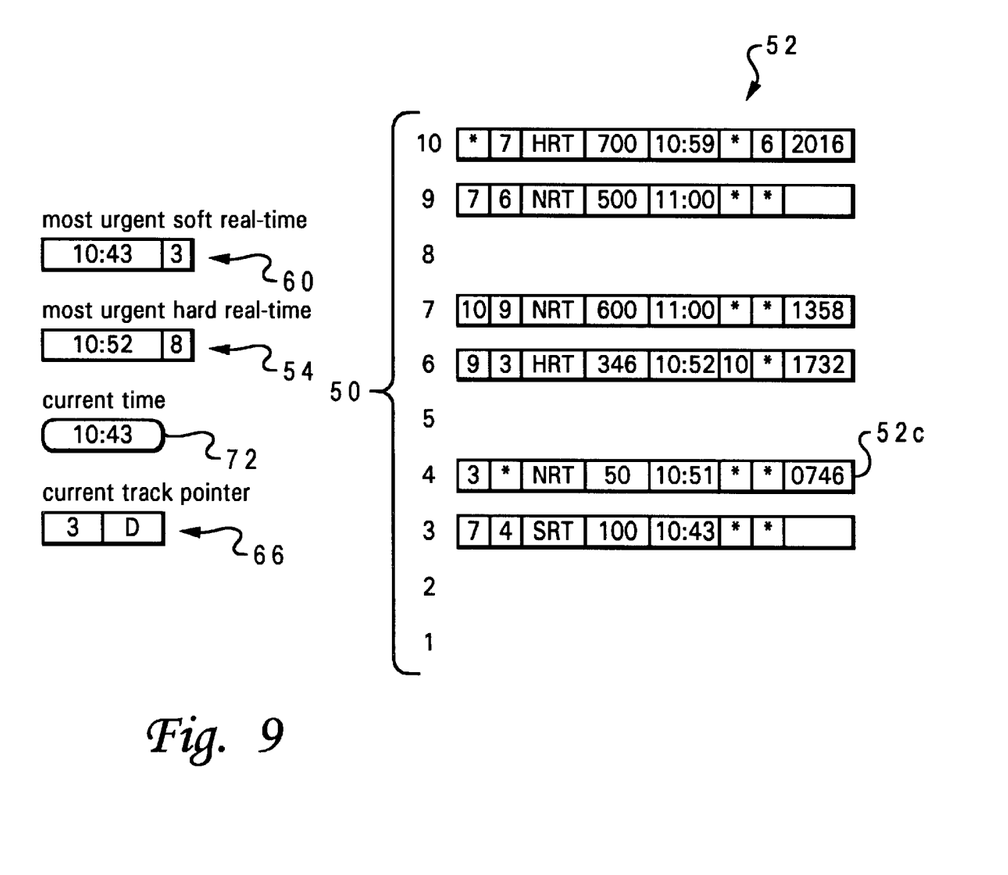
FIG. 9 depicts the scan queue elements stored within a scan queue, the most urgent soft real-time buffer, the most urgent hard real-time buffer, the current time clock, and the current track scan pointer of FIG. 8 after two more elements have been removed and a non-real-time element has been added in accordance with the method and system of the present invention.

FIG. 9 depicts the scan queue having scan queue elements, the most urgent soft real-time buffer, the most urgent hard real-time buffer, the current time clock, and the current track scan pointer of FIG. 8 after two more elements 52a, 52b have been removed and a non-real-time element 52c has been added in accordance with the method and system of the present invention. The current time is now 10:43 which is the time the most urgent soft real-time request is to be serviced. From the state depicted in FIG. 8 to this current state, no deadline had elapsed. The next two sequential requests were serviced. These were the elements at location 2 and then at location 8. The element at location 8 was the most urgent hard real-time request since it has been service, before its deadline, the most urgent hard real-time request pointer has been updated. Using the real-time ascending pointer of the element at location 8, the element at location 6 is selected as the current most urgent hard real-time request. Therefore, the hard real-time pointer is updated with this location and deadline. The pointers on the element at location 6 have also been updated in a manner consistent with the management of a double linked list. The current time is now 10:43 which is the deadline for the current most urgent soft real-time request. The current track pointer is set to point to the element at location 3 which is the current most urgent soft real-time request. This will now be the next element removed and the scan will continue sequentially from this point. The track pointer went from higher track numbers to lower track numbers in order to service the element at location 3. Since the direction of the scan changed, the track pointer is updated from ascending to descending. A non-real-time request to track 500 has been added at location 9.

While an illustrative embodiment has been particularly shown and described, it will be understood by those skilled in the art that various changes in form and detail may be made therein without departing from the spirit and scope of the illustrative embodiment.

What is claimed is:

1. A method in a data processing system for dynamically scheduling a plurality of requests to access a disk, each of said plurality of requests being associated with a location on said disk which each of said plurality of requests attempts to access, said method comprising the steps of:

establishing a scan queue for storing a plurality of requests;

processing said plurality of requests in a sequential order, said sequential order being determined utilizing said location on said disk being accessed by each of said plurality of requests;

upon one of said plurality of stored requests being urgent, processing said urgent request, said urgent request being associated with a first location on said disk; and continuing processing said plurality of requests in a second sequential order, said second sequential order being determined utilizing said first location, wherein a next of said plurality of requests to be processed is one of said plurality of requests which is associated with a physically closest location on said disk.

2. The method according to claim 1, further comprising the step of determining a next of said plurality of requests in said sequential order to be processed, said next of said plurality of requests being one of said plurality of requests having an associated location on said disk physically closest to a last processed one of said plurality of requests.

3. The method according to claim 2, wherein said step of processing said plurality of requests further comprises the step of processing said plurality of requests utilizing a disk arm traveling in either an ascending or descending direction.

4. The method according to claim 3, further comprising the step of prior to determining said next of said plurality of requests in said sequential order, determining a disk arm direction.

5. The method according to claim 4, wherein said step of determining a next of said plurality of requests in said sequential order to be processed further comprises the step of determining a next of said plurality of requests in said sequential order to be processed, said next of said plurality of requests being one of said plurality of requests having an associated location on said disk physically closest to a last processed one of said plurality of requests in said determined disk arm direction.

6. The method according to claim 5, wherein said step of processing a plurality of requests further comprises the step of processing a plurality of requests including a first plurality of requests and a second plurality of requests, said first plurality of requests including only real-time requests and said second plurality of requests including only non-real-time requests.

7. The method according to claim 6, further comprising the step of processing said first plurality of requests, each of said first plurality of requests having an associated deadline on or before which each of said first plurality of requests should be processed.

8. The method according to claim 7, further comprising the step of processing said second plurality of requests, each of said second plurality of requests having an associated deadline on or before which each of said second plurality of requests should be processed.

9. The method according to claim 8, wherein said step of one of said plurality of stored requests being urgent further comprises the step of one of said plurality of stored requests being at or past its deadline.

10. The method according to claim 9, wherein said step of processing said first plurality of requests further comprises the step of processing hard real-time requests and soft real-time requests, wherein each of said hard real-time requests must be processed on or before its associated deadline to avoid catastrophic results, and where each of said soft real-time requests do not need to be processed on or before its associated deadline to avoid catastrophic results.

11. The method according to claim 10, further comprising the steps of:
   determining if any of said hard real-time requests are at or past the deadline associated with each of said hard real-time requests; and
   in response to a determination that any of said hard real-time requests are at or past the deadline associated with each of said hard real-time requests, processing each of said hard real-time requests which are at or past the deadline associated with each of said hard real-time requests.

12. The method according to claim 11, further comprising the steps of:
   determining if any of said soft real-time requests are at the deadline associated with each of said soft real-time requests; and
   in response to a determination that any of said soft real-time requests are at the deadline associated with each of said soft real-time requests, processing each of said soft real-time requests which are at the deadline associated with each of said soft real-time requests.

13. The method according to claim 12, further comprising the steps of:
   determining if any of said soft real-time requests are past the deadline associated with each of said soft real-time requests; and
   in response to a determination that any of said soft real-time requests are past the deadline associated with each of said soft real-time requests, discarding each of said soft real-time requests which are past the deadline associated with each of said soft real-time requests.

14. The method according to claim 13, further comprising the step of for each of said plurality of requests, maintaining a first pointer to a next of said plurality of requests in said sequential order and maintaining a second pointer to a previous of said plurality of requests in said sequential order.

15. The method according to claim 14, further comprising the step of for each of said hard real-time requests, maintaining a first pointer to a next most urgent of said hard real-time requests and maintaining a second pointer to a next less urgent of said hard real-time requests.

16. The method according to claim 15, further comprising the step of for each of said soft real-time requests, maintaining a first pointer to a next most urgent of said soft real-time requests and maintaining a second pointer to a next less urgent of said soft real-time requests.

17. The method according to claim 16, further comprising the step of establishing a hard real-time buffer including a pointer to one of said hard real-time requests which is the most urgent of said hard real-time requests and said buffer including a deadline associated with said one of said hard real-time requests which is the most urgent.

18. The method according to claim 17, further comprising the step of establishing a soft real-time buffer including a pointer to one of said soft real-time requests which is the most urgent of said soft real-time requests and said buffer including a deadline associated with said one of said hard real-time requests which is the most urgent.

19. The method according to claim 18, further comprising the step of utilizing said first and second pointers to said hard real-time requests to maintain said hard real-time buffer.

20. The method according to claim 19, further comprising the step of utilizing said first and second pointers to said soft real-time requests to maintain said soft real-time buffer.

21. A data processing system for dynamically scheduling a plurality of requests to access a disk, each of said plurality of requests being associated with a location on said disk which each of said plurality of requests attempts to access, comprising:
   means for establishing a scan queue for storing a plurality of requests;
   means for processing said plurality of requests in a sequential order, said sequential order being determined utilizing said location on said disk being accessed by each of said plurality of requests;
   means for upon one of said plurality of stored requests being urgent, processing said urgent request, said urgent request being associated with a first location on said disk; and
   means for continuing processing said plurality of requests in a second sequential order, said second sequential order being determined utilizing said first location, wherein a next of said plurality of requests to be processed is one of said plurality of requests which is associated with a physically closest location on said disk.

22. The system according to claim 21, further comprising means for determining a next of said plurality of requests in said sequential order to be processed, said next of said plurality of requests being one of said plurality of requests having an associated location on said disk physically closest to a last processed one of said plurality of requests.

23. The system according to claim 22, wherein said means for processing said plurality of requests further comprises means for processing said plurality of requests utilizing a disk arm traveling in either an ascending or descending direction.

24. The system according to claim 23, further comprising means for prior to determining said next of said plurality of requests in said sequential order, determining a disk arm direction.

25. The system according to claim 24, wherein said means for determining a next of said plurality of requests in said sequential order to be processed further comprises means for determining a next of said plurality of requests in said sequential order to be processed, said next of said plurality of requests being one of said plurality of requests having an associated location on said disk physically closest to a last processed one of said plurality of requests in said determined disk arm direction.

26. The system according to claim 25, wherein said means for processing a plurality of requests further comprises means for processing a plurality of requests including a first plurality of requests and a second plurality of requests, said first plurality of requests including only real-time requests and said second plurality of requests including only non-real-time requests.

27. The system according to claim 26, further comprising means for processing said first plurality of requests, each of said first plurality of requests having an associated deadline on or before which each of said first plurality of requests should be processed.

28. The system according to claim 27, further comprising means for processing said second plurality of requests, each of said second plurality of requests having an associated deadline on or before which each of said second plurality of requests should be processed.

29. The system according to claim 28, wherein said means for one of said plurality of stored requests being urgent further comprises means for one of said plurality of stored requests being at or past its deadline.

30. The system according to claim 29, wherein said means for processing said first plurality of requests further comprises means for processing hard real-time requests and soft real-time requests, wherein each of said hard real-time requests must be processed on or before its associated deadline to avoid catastrophic results, and where each of said soft real-time requests do not need to be processed on or before its associated deadline to avoid catastrophic results.

31. The system according to claim 30, further comprising:
means for determining if any of said hard real-time requests are at or past the deadline associated with each of said hard real-time requests; and
means responsive to a determination that any of said hard real-time requests are at or past the deadline associated with each of said hard real-time requests, for processing each of said hard real-time requests which are at or past the deadline associated with each of said hard real-time requests.

32. The system according to claim 31, further comprising:
means for determining if any of said soft real-time requests are at the deadline associated with each of said soft real-time requests; and
means responsive to a determination that any of said soft real-time requests are at the deadline associated with each of said soft real-time requests, for processing each of said soft real-time requests which are at the deadline associated with each of said soft real-time requests.

33. The system according to claim 32, further comprising:
means for determining if any of said soft real-time requests are past the deadline associated with each of said soft real-time requests; and
means responsive to a determination that any of said soft real-time requests are past the deadline associated with each of said soft real-time requests, for discarding each of said soft real-time requests which are past the deadline associated with each of said soft real-time requests.

34. The system according to claim 33, further comprising means for each of said plurality of requests, for maintaining a first pointer to a next of said plurality of requests in said sequential order and maintaining a second pointer to a previous of said plurality of requests in said sequential order.

35. The system according to claim 34, further comprising means for each of said hard real-time requests, for maintaining a first pointer to a next most urgent of said hard real-time requests and maintaining a second pointer to a next less urgent of said hard real-time requests.

36. The system according to claim 35, further comprising means for each of said soft real-time requests, for maintaining a first pointer to a next most urgent of said soft real-time requests and maintaining a second pointer to a next less urgent of said soft real-time requests.

37. The system according to claim 36, further comprising means for establishing a hard real-time buffer including a pointer to one of said hard real-time requests which is the most urgent of said hard real-time requests and said buffer including a deadline associated with said one of said hard real-time requests which is the most urgent.

38. The system according to claim 37, further comprising means for establishing a soft real-time buffer including a pointer to one of said soft real-time requests which is the most urgent of said soft real-time requests and said buffer including a deadline associated with said one of said hard real-time requests which is the most urgent.

39. The system according to claim 38, further comprising means for utilizing said first and second pointers to said hard real-time requests to maintain said hard real-time buffer.

40. The system according to claim 39, further comprising means for utilizing said first and second pointers to said soft real-time requests to maintain said soft real-time buffer.

* * * * *